United States Patent [19]

Oates et al.

[11] 4,259,620

[45] Mar. 31, 1981

[54] LOW COST, VARIABLE SPEED, CONSTANT TORQUE INDUCTION MOTOR DRIVE

[75] Inventors: Robert M. Oates; Theodore M. Heinrich, both of Murrysville, Pa.

[73] Assignee: Westinghouse Electric Corp., Pittsburgh, Pa.

[21] Appl. No.: 952,428

[22] Filed: Oct. 18, 1978

[51] Int. Cl.³ .............................................. H02P 5/40
[52] U.S. Cl. .................................... 318/802; 318/811; 363/41; 363/132; 363/137
[58] Field of Search ............... 318/798, 802, 803, 805, 318/810, 811; 363/41, 43, 132, 137

[56] References Cited

U.S. PATENT DOCUMENTS

| | | | |
|---|---|---|---|
| 3,402,336 | 9/1968 | Risberg | 318/803 |
| 3,603,856 | 9/1971 | Zalar et al. | 318/798 |
| 3,775,652 | 11/1973 | Bowler et al. | 318/810 X |
| 4,044,285 | 8/1977 | Plunkett et al. | 318/803 |

Primary Examiner—Gene Z. Rubinson
Attorney, Agent, or Firm—C. M. Lorin

[57] ABSTRACT

A low cost, small rating AC motor drive includes an inverter in which static controlled switches are in two sets associated with opposite poles and controlled in such a way that current continuously fed is sensed relative to one set for feedback current sensing and that the switch current is modulated in the other set in order to regulate the motor current. When starting, or overloaded, the motor drive speed is automatically reduced under air gap motor sensing.

3 Claims, 11 Drawing Figures

LOW COST, VARIABLE SPEED, CONSTANT TORQUE INDUCTION MOTOR DRIVE

BACKGROUND OF THE INVENTION

The invention relates in general to static AC motor drives and more particularly to an improved and low cost design for small rating motor drives of this type.

Static AC motor drives typically draw power from a DC source coupled with an inverter. The prior art is replete with techniques for controlling the static switches of the inverter in order to control current supply, e.g. the torque of the motor and the frequency of the inverter, e.g. the speed of the motor. In particular special circuits have been designed which in the starting mode insure that the flux in the motor is sufficient while preventing an inrush of starting currents which would overload the inverter.

In general, it is not economically feasible to supply starting inrush currents to an induction motor when it is excited by a variable frequency, solid-state inverter. If the output current of the inverter is limited to about one per unit by appropriately controlling the inverter output voltage and if the motor is operating at a slip greater than its rated pull out slip, the torque generated by the motor will be quite meager and may be insufficient to accelerate the motor to the desired speed. Such a condition could occur during starting or if the motor were temporarily overloaded. In order to prevent this, the usual practice is to measure the motor speed, calculate the motor slip, and limit the slip to less than pull out slip by adjusting the excitation frequency. Because of the tachometer cost, this approach is not feasible for a low cost drive.

The object of the present invention is to provide a low cost, variable speed, constant torque induction motor drive.

SUMMARY OF THE INVENTION

The invention relates to an induction motor drive including an induction motor which is current-fed by a static controlled inverter circuit energized by a direct current power source. Current is distributed between a plurality of static controlled switches which are modulated in conduction by a current feedback loop in relation to the one pole of the direct current source associated with the inverter. Means is provided for deriving a signal representative of the motor flux and means is provided for controlling the switches in relation to the derived flux representative signal for establishing a desired current supply in the induction motor. More specifically a coil is placed in the teeth of the stator of the motor in order to sense the air gap voltage, and a control loop is provided for adjusting the inverter current as to hold a constant air gap flux. The motor drive is controlled in such a way that the inverter supplies at any given time no more than the rated current of the motor. The inverter maintains the supplied current in relation to the sensed air gap voltage, the frequency of the inverter being automatically reduced when the flux in the motor has become too small.

Normally, in the motor drive according to the invention, the current and the frequency of the inverter are controlled as a function of the air gap voltage of the coupled induction motor, the selection being in relation to the level of the sensed flux of the motor. Since the control circuit approximately adjusts inverter frequency and current to hold a constant air gap flux, the inverter, which supplies only rated motor current, can start the motor at any speed setting and can provide constant torque over a wide speed range. No tachometer is required. As will appear from the description hereafter, the control circuit and the inverter power stage of the motor drive according to the invention scheme are remarkably simple and of low cost.

A primary feature of the invention is the method by which the motor current is regulated. A current request, as determined by the flux loop, is routed to each of the three inverter phases by a master distributor. Each phase is in turn asynchronously modulated so as to keep its current within a tolerable error limit of the requested current. Thus, the inverter is inherently protected against overcurrents, and the motor always sees the desired voltage to frequency (constant V/F) relationship. At low speeds the motor current is uniformly distributed between the phases, allowing smooth operation without the need for complex, costly pulse width modulation schemes.

DESCRIPTION OF THE PREFERRED EMBODIMENT

Figure 1:
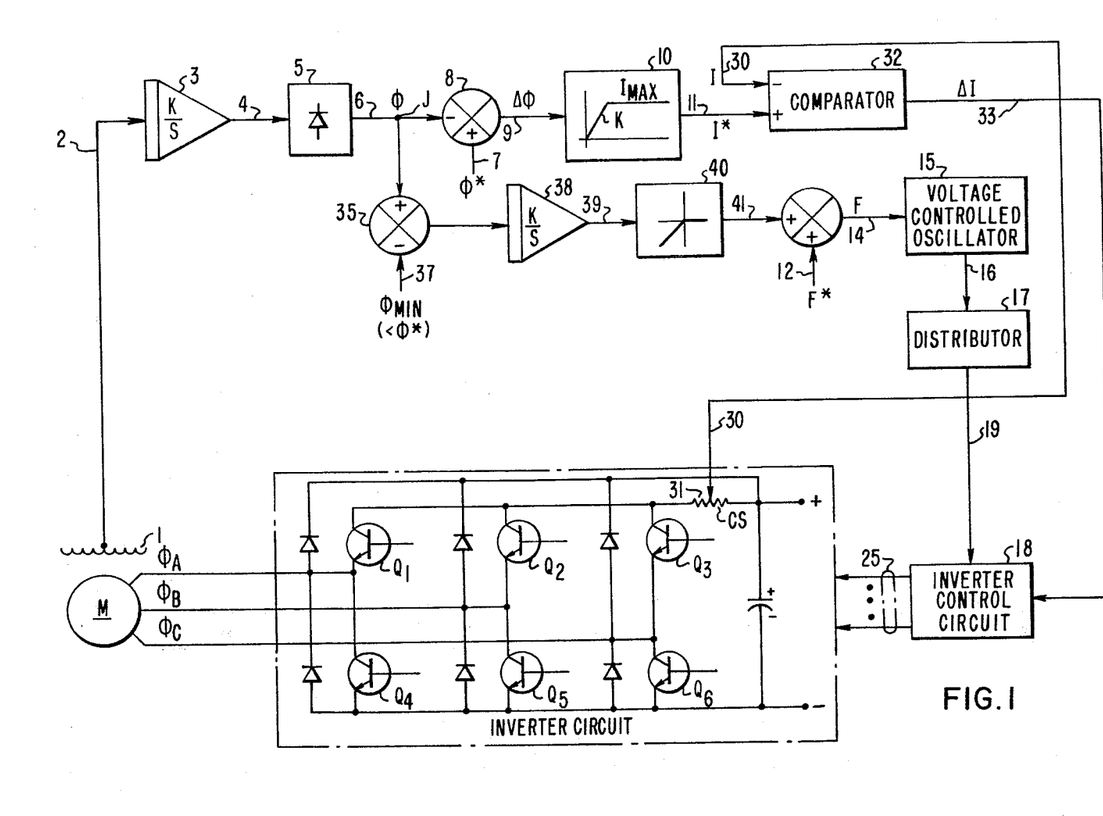
FIG. 1 is a functional block diagram of the motor drive according to the invention.

FIG. 1 shows an induction motor supplied with AC current from a 3 phase inverter converting power from a DC source ($E_{DC}$). Three static switches $Q_1$, $Q_2$, $Q_3$ are associated with the positive polarity and $Q_4$, $Q_5$, $Q_6$ with the opposite polarity, which are controlled in such a way that, normally, only rated motor current is supplied, while allowing the motor to start and maintain a constant torque over a wide speed range.

The control operation of the inverter and the associated induction motor M according to the invention can best be understood by referring to the block diagram of FIG. 1.

Figure 2:
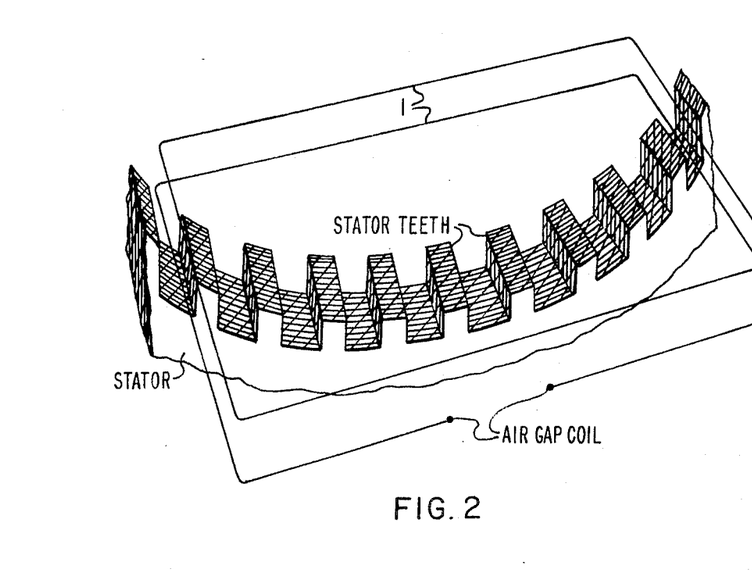
FIG. 2 shows the air gap coil in relation to the stator poles of the motor.

A coil 1 (shown in FIG. 2 in relation to the teeth of the stator) is mounted on the stator in such a way that it forms a loop stretching over the width of one pole. As shown in FIG. 2, for 36 slots of a four-pole machine, coil 1 covers 9 slots.

The air gap voltage sensed by coil 1 is applied via line 2 to an integrator 3, and the integrated signal which is representative of the flux is rectified by circuit 5 so that a unidirectional signal $\phi$ representing the motor flux is generated on line 6. The flux signal of line 6 is compared to a flux reference signal $\phi^*$, carried on line 7, by a summer 8. The outputted error $\Delta\phi$, on line 9, is amplified by circuit 10, thus deriving a current reference signal I* on line 11. In the inverter, a current sensor, namely a resistor 31 having a central tap, is provided between the positive pole of the DC source and any of the collectors of transistors $Q_1$, $Q_{23}$ associated thereto. A current representative signal is derived from resistor 31 via line 30 and applied, together with signal I* of line 11, as a second input to a comparator 32. The error signal $\Delta I$ outputted on line 33 is applied as control signal to an inverter control circuit which is illustrated as a base drive for the transistors $Q_1$–$Q_6$ by lines 25, in accordance with a sequence defined by a distributor 17. The frequency of distribution of the conductive states between the various transistors is defined by a voltage controlled oscillator 15 controlling the distributor by a clock signal on line 16, which is fixed in accordance with a setpoint (line 12) representing the desired motor speed. Thus, through feedback, the loop defined between resistor R, comparator 32 and the inverter control circuit 18, conduction of the switches is regulated in order to automatically maintain the current in the motor at a value defined by I*, e.g. by the air gap voltage sensed with coil 1, thereby maintaining the rated value. The particularity of this control resides in that the distributor 17 maintains 120° conduction for each switch, while treating the switches as two separate sets $Q_1$, $Q_2$, $Q_3$ and $Q_4$, $Q_5$, $Q_6$, related to the respective poles of the DC source. Control of the current is performed with regard to one set, namely ($Q_4$, $Q_5$, $Q_6$) here, while deriving feedback current from the feeding line affected to the other set, namely the positive pole and set ($Q_1$, $Q_2$, $Q_3$).

The result is independence between the modulation effect on the current and the current sensing function. This is one distinctive feature of the motor drive according to the invention, and how this is done will be explained and described later in the description. A second feature of the invention resides in the way the motor drive is protected against pull-out when starting or overloaded. Referring to FIG. 1, the $\phi$ signal of line 6 is compared by summer 35 with a $\phi_{min}$ reference signal received on line 37. The $\phi_{min}$ signal represents a minimum flux level that should not be exceeded downward in the air gap. The error at the output is applied to an integrator 38 and the DC signal on line 39 is passed through a threshold function generator 40 whereby on line 41 a signal is generated which is zero as long as $\phi_{min}$ is not reached on line 6 from circuit 5. As soon as the threshold is reached, circuit 40 develops a signal proportional to the excess under $\phi_{min}$. The signal of line 41 is compared with a reference frequency signal F* within summer 13, and the error on line 14 applied to the voltage controlled oscillator 15 causes a proportional frequency decrease in the distributor 17, by changing the setpoint established from line 12 for the speed.

From the preceding it appears that the signal from coil 1 in the air gap is used for two purposes:

a. The flux signal $\phi$ is compared to a reference $\phi^*$. The resulting error signal is amplified and provides the inverter's current request I*. When the flux requirement is satisfied, only a minimum current is requested, but when the flux is low, a proportionally higher current is requested. This current forces the inverter to put out a higher voltage and consequently a higher air gap flux, thus forming a closed loop system. The current request I* is clamped to provide current slightly greater than the rated current to protect the inverter.

b. In the event that function a) cannot maintain the requested flux, $\phi$ would fall below a minimum level $\phi_{min}$. The flux $\phi$ is compared to such minimum flux level $\phi_{min}$ as a reference. When $\phi$ is less than $\phi_{min}$, an error signal is integrated and used to lower the inverter's frequency by lowering the input to a voltage controlled oscillator. As the inverter frequency is lowered, the air gap flux (integral of air gap voltage) is increased.

Figure 3:
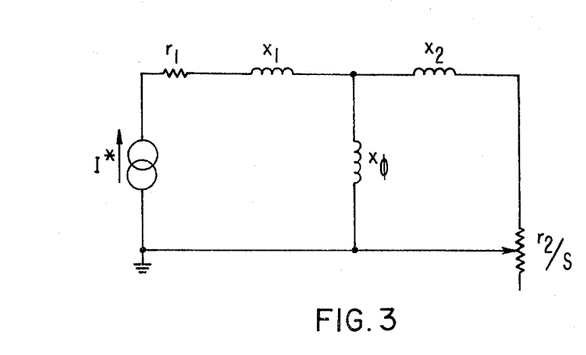
FIG. 3 is a representation of the equivalent circuit of the induction motor.

Operation of functions (a) and (b) can be understood by considering FIG. 3 which represents the equivalent circuit of a polyphase induction (characterized by resistor $r_1$, inductances $X_1$ and $X_2$ and $X_{100}$ with $r_2/x$ for the load) with a current source input. At no load, the slip S is nearly zero and the resistance $r_2/s$ is very high. Nearly all the motor's terminal voltage appears across the air gap. However, as the machine is loaded, s increases and $r_2/s$ decreases, decreasing the air gap voltage, and the air gap flux. The motor current and hence terminal voltage are then raised by the aforementioned control loops to maintain the requested flux.

During motor starting, however, the slip is very high and the inverter's maximum current will not allow the motor to supply much torque because there is little air gap flux. Function (b) senses this condition, and lowers the inverter frequency so that the slip is reasonable and the flux is maintained.

During normal operation, the inverter frequency F is the same as the requested frequency F* and the current I* is adjusted to suit the needs of the load. Motor speed corresponds to F except for the relatively small slip. During starting or when the rated torque of the drive is exceeded, the inverter frequency and motor speed are lowered to maintain the minimum requested flux. As a result, the motor can be started at any speed setting and can recover from a mechanical overload after it is removed while still limiting the motor current to a nominal value.

Figure 4:
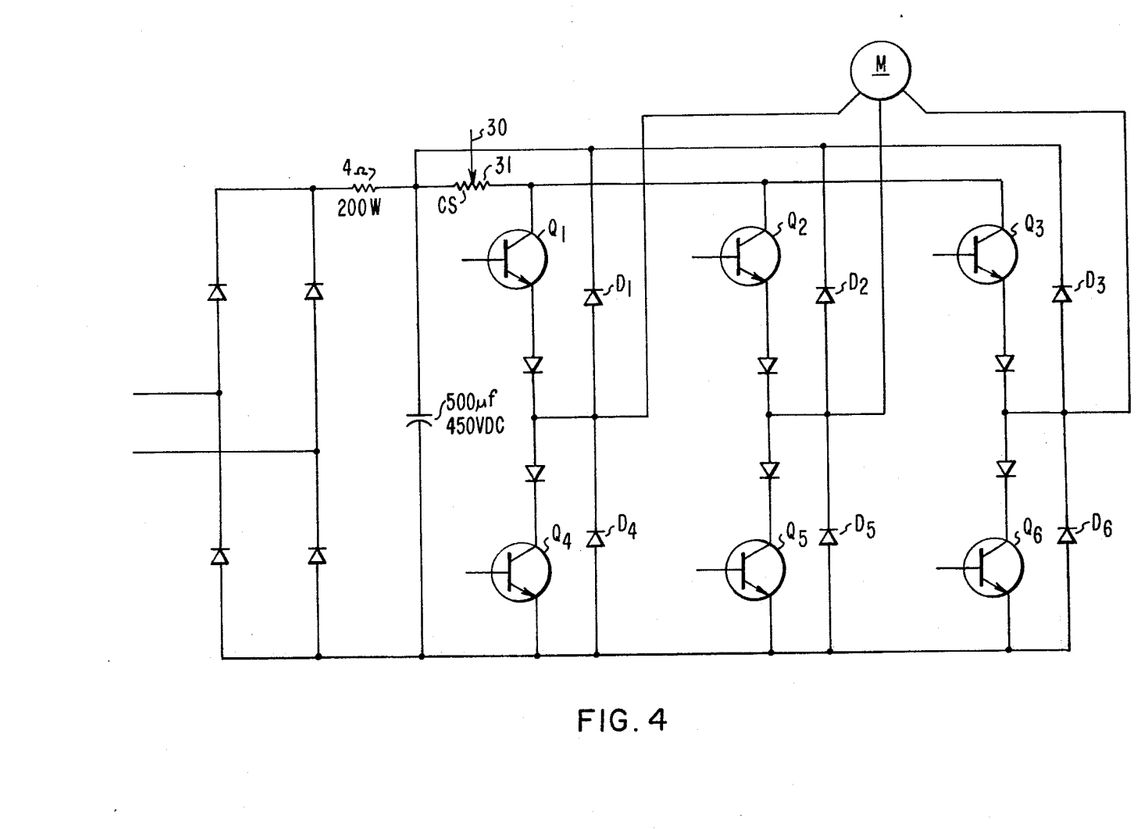
FIG. 4 shows the power stage of the motor drive in the preferred embodiment.
Figure 5:
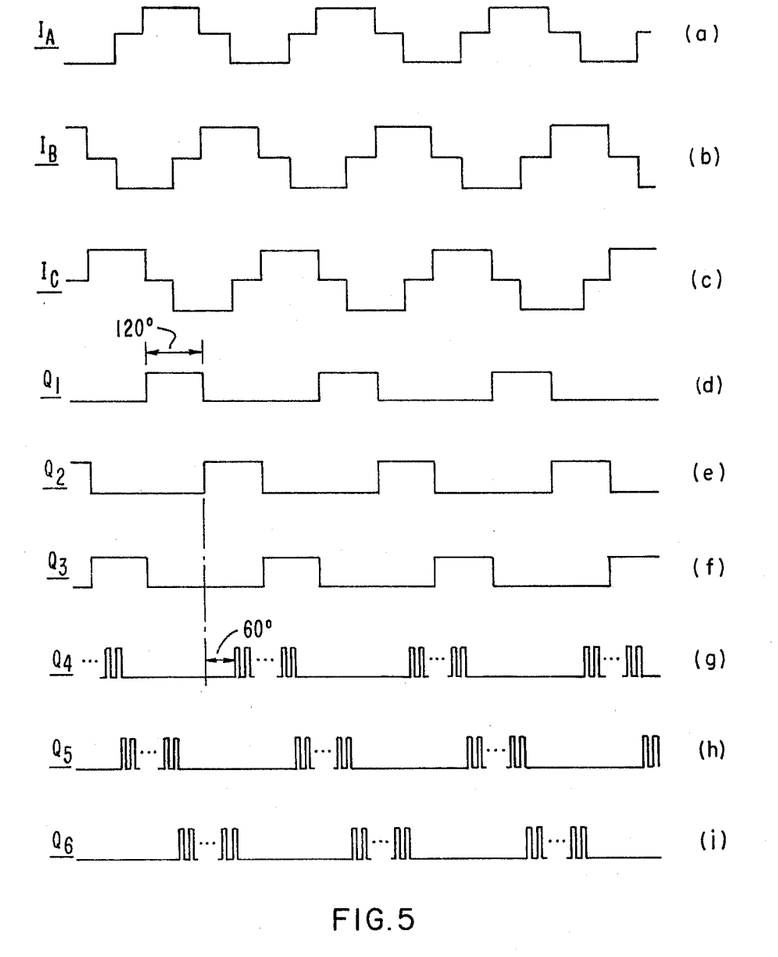
FIG. 5 shows with curves the relation of the conduction periods of the static switches of the inverter to the phases of the motor which are part of the motor drive.

The power stage is shown in FIG. 4. It consists of a full-wave, three-phase, bridge used in a current controlled manner. For the sake of clarity it is assumed that the induction motor is in a Y configuration, so that each switch is connected between one pole of the source and one end of a winding and one phase. It is clear, though, that the invention is directly applicable to a delta-configuration as well. Each of the switches $Q_1$–$Q_6$ by the distributor 17 is gated for conductor during 120° of the fundamental frequency, as shown on curves (d-i) of FIG. 5. However, each of the lower switches are modulated during the allowable 120° period so as to maintain the total inverter current as sensed by 31 (FIG. 1) at the requested level I*. The current loop operates in an optimal response or "bang-bang" mode so that a switch is turned ON when I is below $I^* - \frac{1}{2}\Delta I$ and turned OFF when I is above $I^* + \frac{1}{2}\Delta I$ where $\Delta I$ is a tolerated error zone. As a result, all switches are instantaneously protected from excessive current.

Figure 6:
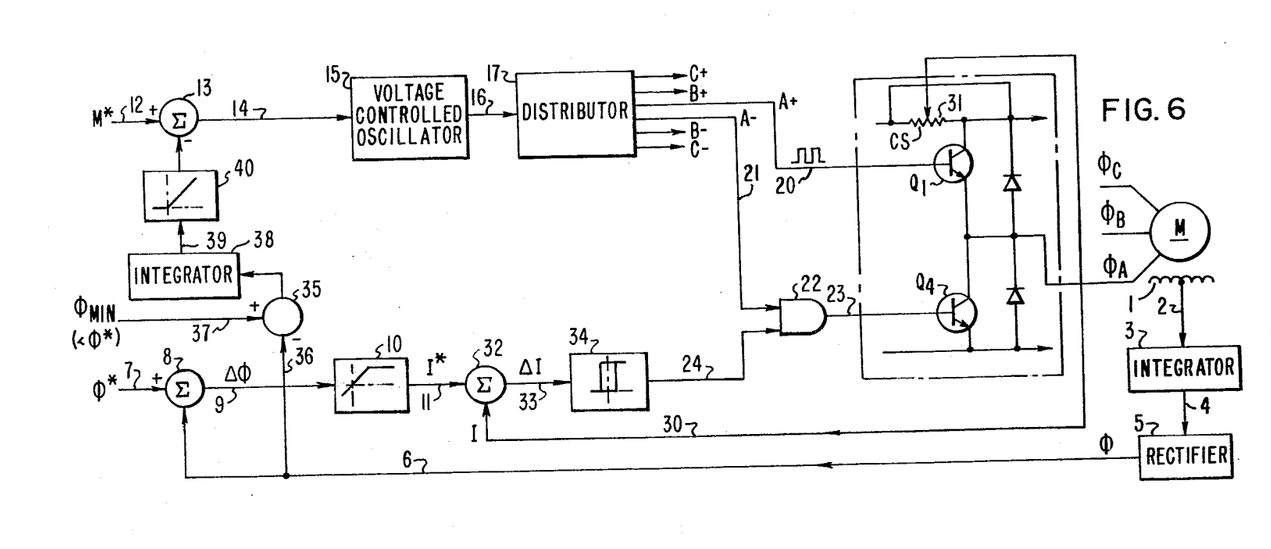
FIG. 6 is a block diagram showing the control circuit of the motor drive in the preferred embodiment.

Referring to FIG. 6, the preferred embodiment of the motor drive according to the invention is shown with details around a logic gate 22 related to the base of transistor $Q_4$ which explain over FIG. 1 how current is modulated in the current loop.

The three lower transistors $Q_4$, $Q_5$, and $Q_6$ are modulated, like shown for transistor $Q_4$ on the FIG. 6, to regulate the inverter current, whereas transistors $Q_1$, $Q_2$, $Q_3$ are not, and resistor 31 is placed in relation with the positive pole of the DC source. Thus, the current sensing resistor is positioned so as to see only the transistor current.

Figure 7:
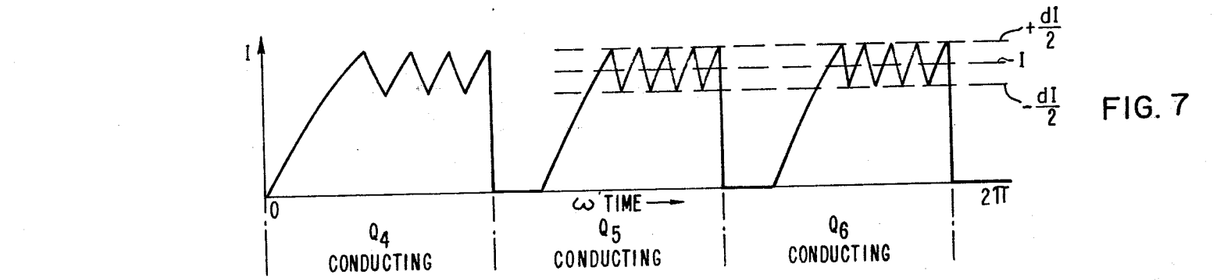
FIG. 7 illustrates the modulation technique applied to the static switches of one set of the controller in the motor drive of FIG. 5.

Distributor 17 controls $Q_1$, $Q_2$, $Q_3$ (normally the switches associated with the positive pole) via lines such as 20 and $Q_4$, $Q_5$, $Q_6$ (normally the switches associated with the negative pole) via lines such as 21 and 24 passing through NAND gate 22. Assuming NAND gate never impedes the distributor signal on line 21, all switches are conducting fully during 120° as shown by curves (d) to (i) of FIG. 5. On FIG. 5, still assuming a Y configuration of the windings in the motor, the switches (actually transistors) appear in pairs relative to each winding with the switches of each pair connected to two different poles of the DC source. The switches also belong to separate sets $Q_1$, $Q_2$, $Q_3$ and $Q_4$, $Q_5$, $Q_6$, relative to the respective poles. Each switch is conductive for 120°, namely 360/3, and the two sets are shifted by a multiple of 60° ($-60°$ on FIG. 3). The distributor 17 distributes the gating signals at 60° from one another, alternatively toward one set or the other, in the order of the switches, thus $Q_1$, $Q_6$, $Q_2$, $Q_4$, $Q_3$, $Q_5$, etc. . . . As a result the current in the windings A, B, C, can be approximated by the $I_A$, $I_B$, $I_C$, by curves (a), (b), (c) as shown on FIG. 5. With such arrangement it is clear that current is flowing continuously from one pole to the associated set of switches. As a result, it is possible on the one hand to sense the current flowing between one set of switches and the associated pole and on the other hand, to modulate the current flowing in the other set of switches for control as a function of such sensed current. To this effect, resistor 31 is connected within the common branch from the positive pole to the respective switches $Q_1$, $Q_2$, $Q_3$. With the other sets, three NAND gates such as 22, are interposed between the distributor 17 (lines such as 21) and the respective base electrodes of transistors $Q_4$, $Q_5$, $Q_6$ associated with the negative pole. The error $\Delta I$ derived from summer 32 is applied via line 33 to an hysteresis circuit establishing a deadband between upper and lower limits ($\pm dI$). When the deadband intervenes, the second input of NAND gate 22 via line 24 modules conduction of the transistor $Q_4$ as shown in FIG. 7. The same modulated current occurs with transistors $Q_5$ and $Q_6$ due to their respective NAND gates (not shown in FIG. 6). Therefore, on FIG. 5 the conduction periods of 120° relative to the controlled switches $Q_4$, $Q_5$ and $Q_6$ have been shown to be discontinuous (curves g, h, i) in contrast to the continuous conduction periods of the non-controlled switches $Q_1$, $Q_2$, $Q_3$ (curves d, e and f).

The bang-bang technique for optimal response in control is generally known. Reference is made in this respect to U.S. Pat. No. 3,636,430 of A. Kernick et al.

Since commutating diodes $D_1$–$D_6$ are associated with the respective switches $Q_1$–$Q_6$ there is a possibility that energy accumulated in the windings tend to circulate through the non-controlled transistors $Q_1$, $Q_2$, $Q_3$ which are, as a set, continuously conductive. Since such undesired current cannot be controlled by turning OFF the controlled, or lower transistors $Q_4$, $Q_5$, $Q_6$ only, provision is made for turning OFF all switches, whenever I becomes greater than a maximum level $I_{max}$ (which in fact is larger than $I^* + dI$), e.g. where the current control loop by switches $Q_4$, $Q_5$, $Q_6$ would fail to contain the motor current and an unacceptable maximum $I_{max}$ would be reached.

Figure 8A:
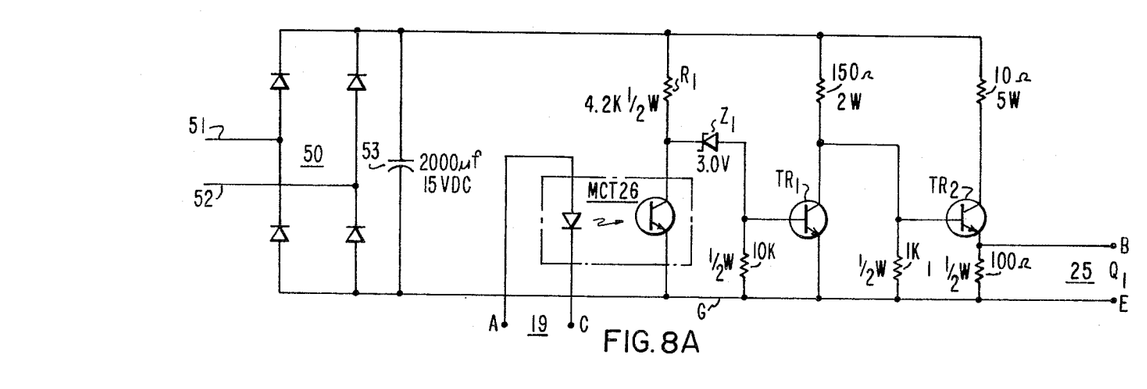
FIGS. 8A and 8B illustrate the actual circuits for the base drives of the two sets of transistors used in the preferred embodiment.

FIG. 8A typically represents the base drive circuitry for applying a controlling gate to the positive switches $Q_1$, $Q_2$, $Q_3$. Three identical such circuits are thus provided in the inverter control circuit 18 which are coupled by lines 25 to $Q_1$, $Q_2$, $Q_3$. An isolated transformer provides on lines 51, 52 AC power which is rectified by a full rectifier bridge 50. Capacitor 53 is charged and the derived DC voltage establishes a normal potential on the base of a first transistor $TR_1$ mounted as a cathode follower with a second transistor $TR_2$, whereby at the output between B and E the blocking level for the gate of $Q_1$, for instance, is derived and applied to the switch. From the distributor 17 on line 19 is applied between A and C the gating command which abruptly changes the state of transistors $TR_1$, $TR_2$. In order to obtain an isolated coupling, an optical connector (MCT26) causes a short circuit to be established between reactor R, and the common mode lead G in parallel to capacitor 53. As a result Zener diode $Z_1$ no longer blocks the base of transistor $TR_1$, and conduction ensues which causes transistor $Q_1$ to become conducting for 120° as explained by reference to FIG. 5.

Figure 8B:
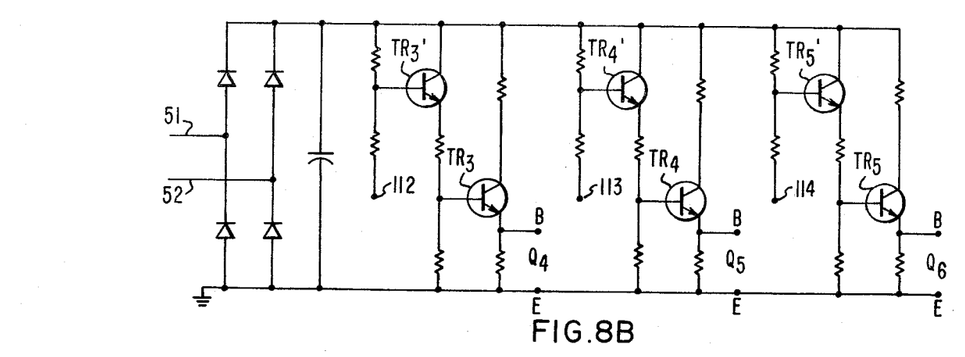

Referring to FIG. 8B, the base drive circuitry for the "controlled" transistors $Q_4$, $Q_5$, $Q_6$ is shown. From the isolated transformer, referred to earlier in relation to FIG. 8A, AC power is derived and rectified in order to apply the necessary voltage to the transistor devices of the circuitry. $Q_4$, $Q_5$ and $Q_6$ are respectively controlled by pairs of transistors ($TR_3'$, $TR_3$), ($TR_4'$, $TR_4$) and $TR_5'$, $TR_5$). These operate as switches responding to a gating signal such as illustrated in FIG. 6 by the NAND gate 22 output for the particular switch $Q_4$.

Figure 9:
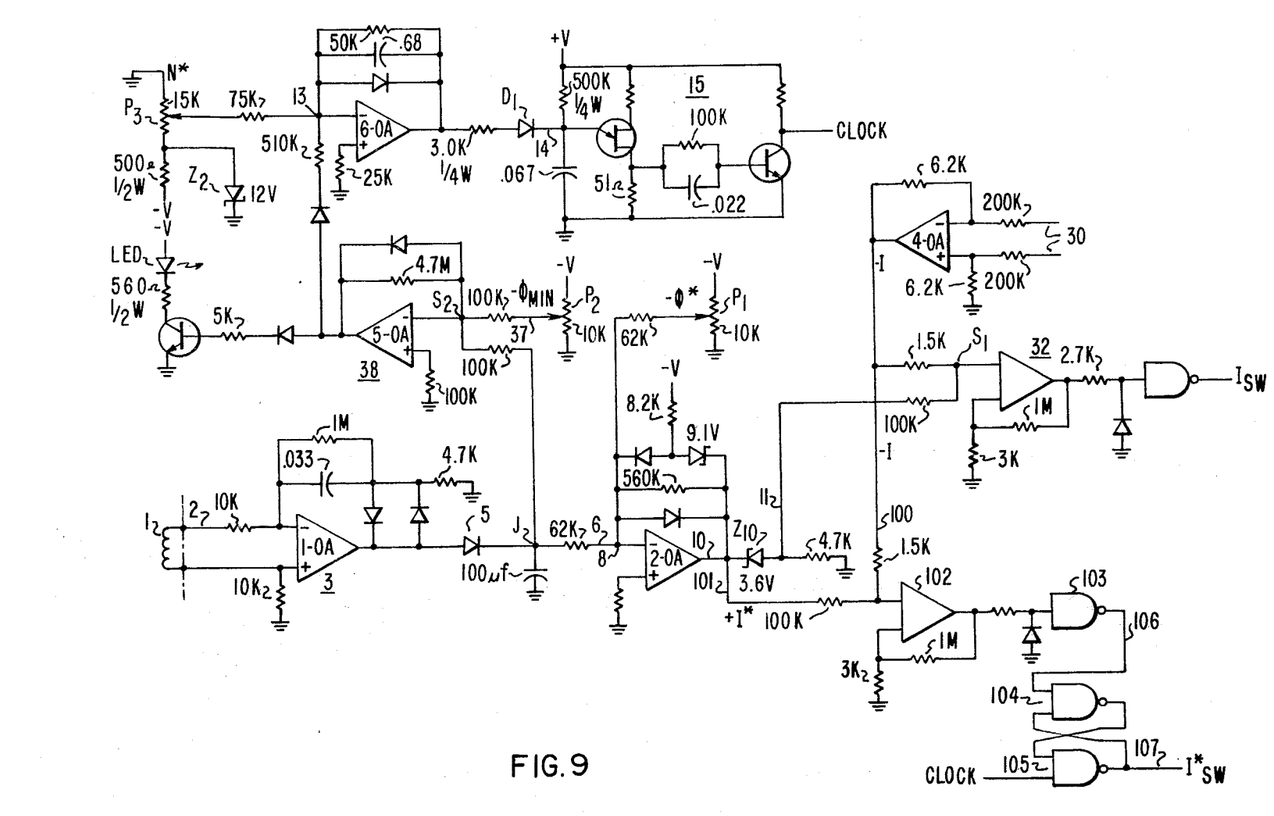
FIG. 9 is the circuitry used in the preferred embodiment of the block diagram of FIGS. 1 and 7.

Referring to FIG. 9, the circuitry used in the preferred embodiment for the current control loop and the minimum flux speed correction loop is shown.

Coil 1 is connected to the input of amplifier 1-0A which is mounted as an integrator; the output is rectified by diode 5. The output of the rectifier is connected to a junction point J. Summer point 8 conveys the signal from junction J via line 6 into the inverting input of operational amplifier 2-0A which is a linear amplifier with a limiter, accomplishing the function of circuit 10 of FIG. 1. Summer 8 also receives from a pot P the reference value of I by line 12. $\Delta\phi$ is derived at the output of 2-0A at the junction of a series network in the positive feedback between the anode of a Zener diode $Z_{10}$ and a resistor $R_{10}$. From such junction, or line 11, is fed into a comparison circuit 32 comprising junction $S_1$ and operational amplifier 3-0A. The feedback current is applied from the sensing resistor via lines 30 as a differential signal into operational amplifier 4-0A and, from there, to summer point $S_1$. The output of 3-0A is applied to the inverter control circuit through the hysteresis circuit of FIG. 6 as explained heretofore.

The output from rectifier 5 is also fed to a summer point $S_2$ at the inverting input of an operational amplifier 5-0A mounted as an integrator (38 in FIG. 1). The reference signal is $\phi_{min}$ derived from a potentiometer $P_2$ and also applied to $S_2$. Summer 13 of FIG. 1 is at the inverting input of operational amplifier 6-0A, where the output from 5-0A combines with the speed signal reference (line 12 in FIG. 1) received from a potentiometer $P_3$ associated with a limiting Zener diode $Z_2$ which accomplishes the function of circuit 40 of FIG. 1. From 6-0A, the frequency reference, after rectification by diode $D_1$, is applied to a conventional voltage controlled oscillator 15.

The circuit of FIG. 9 also includes circuitry which absorbs the reactive current which would otherwise circulate in the non-controlled switches $Q_1$, $Q_2$, $Q_3$. To this effect, as shown in FIG. 9, the sensed feedback current signal from operational amplifier 4-0A is fed by line 100 to a summer point $S_3$ at the input of an operational amplifier 102. Summer point $S_3$ also receives on line 101 the output from 2-0A. As it appears, Zener diode $Z_{10}$ operates as a threshold device between signal I from 4-0A and the critical reference signal $I_1^*$ from 2-0A. Amplifier 7-0A assumes at the output two states depending upon whether I is larger than $I_1^*$ or not. $I_1^*$ represents the reference signal $I^*$ augmented by Zener diode $Z_{10}$ by a predetermined amount. The output of 102, is passed through inverting logic 103. Depending upon the logic state of line 106, a flip-flop (104–105) is set or reset. When it is set, appropriate means cause all the switches $Q_1$-$Q_6$ to be OFF. Thereafter, the switches are turned ON again but only after another 120° period. The control circuit has been refreshed.

Figure 10:
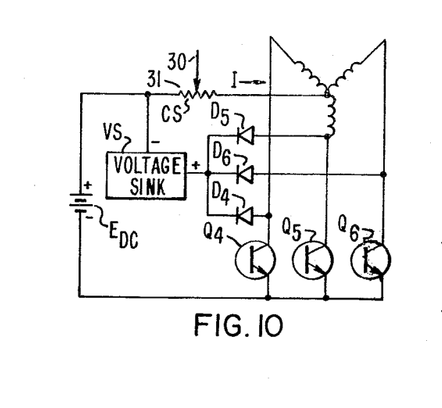
FIG. 10 is a half-wave power stage that can be used in order to eliminate one set of static switches.

Referring to FIG. 10, a still more simple motor drive is shown having only one set of switches, transistors in this particular instance, $Q_4$, $Q_5$, $Q_6$ which are gated for conduction from one phase to the next during consecutive and adjoining equal time intervals. These switches are also controlled in relation to the current sensed in the neutral line from the DC source, in order to regulate the motor current. In this typical half-wave power stage, provision is made for dissipating (or recuperating if necessary) the energy accumulated in the motor windings during conduction of any switch. To this effect, a short-circuiting loop is provided comprising a voltage sink VS connected to the neutral point of the motor and respective diodes $D_4$, $D_5$, $D_6$.

An AC motor drive has been disclosed in which an induction motor is current-fed from a DC voltage source through at least one set of static controlled switches distributed equally among the phases and gated for conduction during respective equal time intervals which are consecutive and adjoining from one switch to the next. With such an arrangement, the total current from the DC source is sensed and combined with a reference in order to regulate the motor current by modulating the conduction of each switch throughout the time interval. In addition, means is provided for dissipating, or recuperating, the energy accumulated in the motor windings during the operation.

We claim:

1. In an AC motor drive having an induction motor supplied with AC current from a DC power source through an inverter, including:
    a first set of three transistors associated with a positive pole of said source;
    a second set of three transistors associated with a negative pole of said source;
    means for gating said transistors by pairs selected from the respective said sets each during 120° time intervals of conduction, said pairs being in relation to respective phases of said motor, and for distributing said time intervals between the respective pairs in succession through the respective motor phases; the combination of: means for sensing the current fed by said source into one of said sets; bang-bang feedback control loop means responsive to the difference between a representative signal derived from said sensing means and a current reference signal operative on said other set for alternately increasing and decreasing said difference in opposite directions about a predetermined mean level and within a predetermined deadband of control; and
    a coil associated with said motor for deriving a signal representative of the flux therein;
    said current reference signal being derived in relation to the difference between said flux representative signal and a flux reference signal.

2. The motor drive of claim 1 with means for establishing a predetermined frequency of succession of said 120° time intervals of conduction by said distributing means and means operative with said frequency establishing means and responsive to said flux representative signal for reducing said predetermined frequency in relation to said flux representative signal when said flux representative signal has decreased below a predetermined minimum level.

3. The motor drive of claim 1 with means responsive to current due to reactive power accumulated in the motor windings and flowing in transistors other than said pair for interrupting conduction in the transistors of the other of said sets at least during said 120° conduction time interval.

* * * * *